United States Patent [19]

Takami

[11] 4,269,490
[45] May 26, 1981

[54] PROGRAMMED SHUTTER GAMMA SWITCHING CIRCUIT

[75] Inventor: Satoshi Takami, Eiza, Japan

[73] Assignee: Asahi Kogaku Kogyo Kabushiki Kaisha, Tokyo, Japan

[21] Appl. No.: 12,693

[22] Filed: Feb. 16, 1979

[30] Foreign Application Priority Data

Mar. 16, 1978 [JP] Japan .................................. 53-30186

[51] Int. Cl.³ .............................................. G03B 7/083
[52] U.S. Cl. ......................................... 354/24; 354/50
[58] Field of Search ...................... 354/24, 50, 51, 60 R

[56] References Cited

U.S. PATENT DOCUMENTS 3,882,511 5/1975 Tsujimoto et al. ................. 354/51 X Primary Examiner—L. T. Hix
Assistant Examiner—W. J. Brady
Attorney, Agent, or Firm—Sughrue, Rothwell, Mion, Zinn and Macpeak

[57] ABSTRACT

A gamma switching circuit of a programmed shutter having a voltage conversion circuit which subjects to logarithmic compression an optical current which varies with $\gamma=1$ with respect to brightness variation. A constant circuit has only an inflow current available and no outflow current is available at the output terminal thereof. A time setting circuit includes a switching circuit and a shutter controlling magnet driving circuit. The output terminal of the voltage conversion circuit is connected through a series circuit of two resistors to the output terminal of said constant voltage circuit, and the connection point between said two resistors is connected to the input terminal of said time setting circuit. The constant voltage circuit applies a voltage to one input terminal of a differential amplifier circuit, and the collector of a transistor whose base is connected to the output terminal of the differential amplifier circuit is connected to the other input terminal of the differential amplifier. The other input terminal of the differential amplifier is employed as an output terminal.

10 Claims, 10 Drawing Figures

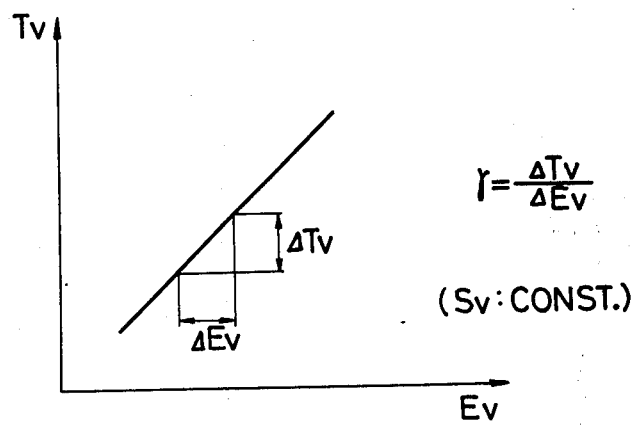
F I G. 1
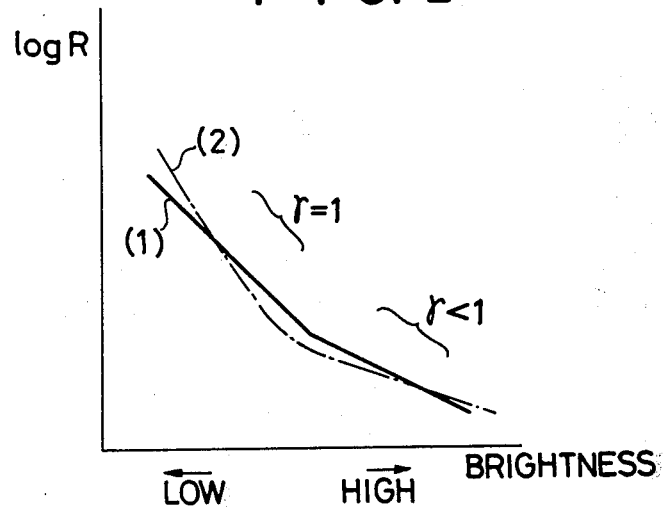
F I G. 2

F I G. 3
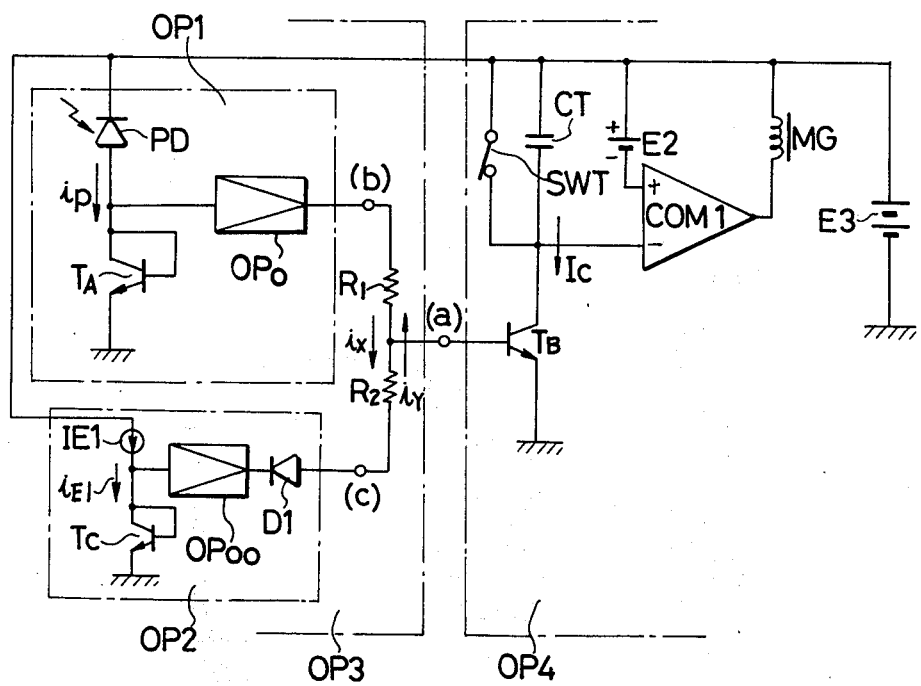
F I G. 4
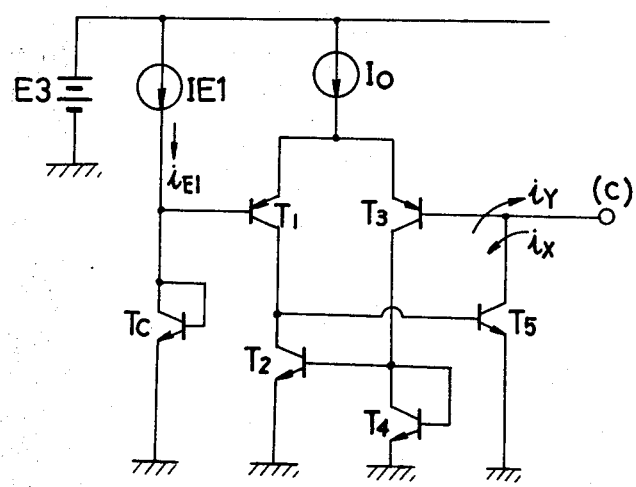

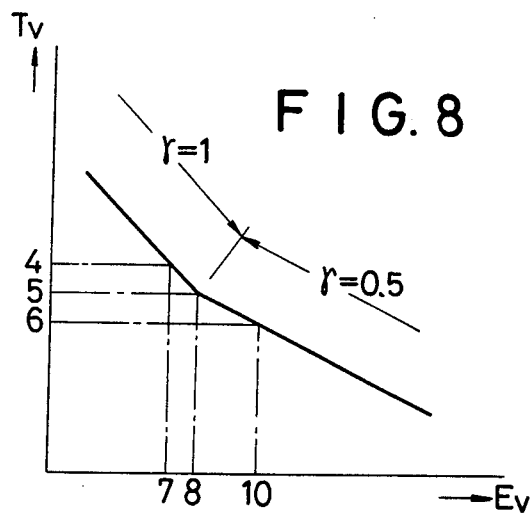
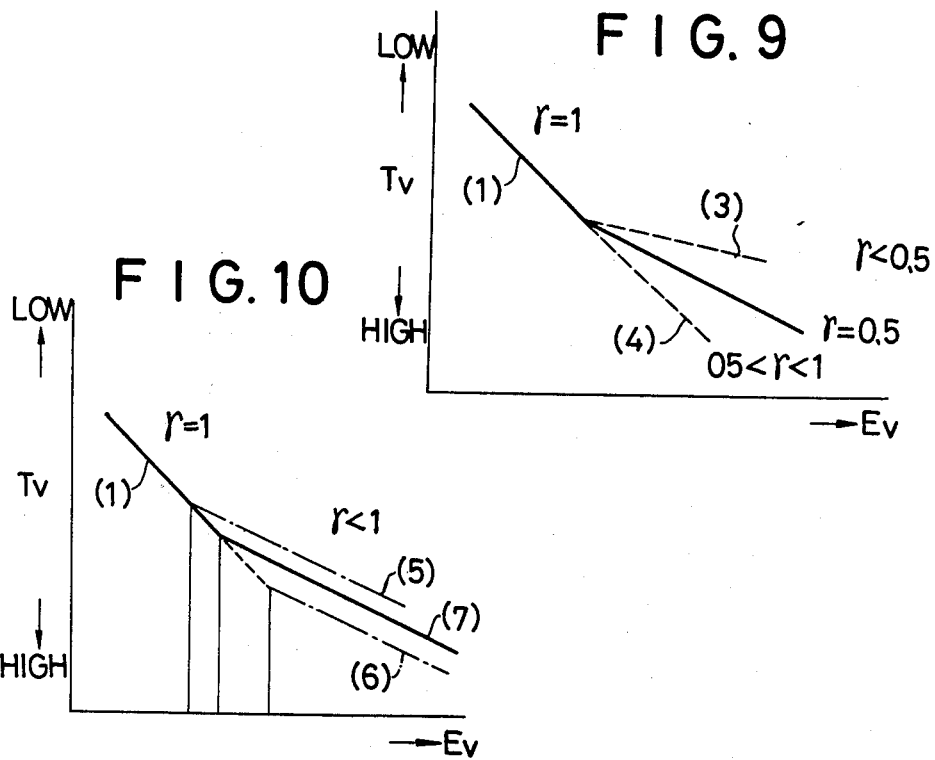

PROGRAMMED SHUTTER GAMMA SWITCHING CIRCUIT

BACKGROUND OF THE INVENTION

This invention relates to switching the gamma ($\gamma$) of shutter control time of a programmed shutter.

First, the gamma ($\gamma$) will be described. In the APEX indication in photographic optics, the following equation is established.

$$E_V = A_V + T_V$$
$$= S_V + B_V$$

where $E_V$ is the exposure exponent; $A_V$ is the aperture value exponent; $T_V$ is the shutter speed exponent; $S_V$ is the film sensitivity exponent; and $B_V$ is the brightness exponent of an object.

The relation between the value $T_V$ and the actual time can be expressed as follows:

$$T = 1/(2^{T_V})$$

In general, in taking pictures it can be considered that the film sensitivity exponent $S_V$ is substantially constant for as long as the roll of film loaded in a camera is used. Therefore, a graph, shown in FIG. 1, can be obtained by plotting the values $T_V$ and $E_V$ respectively along the vertical and horizontal axes. If the quantity of unitary change of $E_V$ is designated by $\Delta E_V$ and the quantity of change of $T_V$ caused when the unitary change $\Delta E_V$ is made is designated by $\Delta T_V$, then $\Delta T_V/\Delta E_V$ is the gamma ($\gamma$) of shutter control time. If the value $S_V$ is constant, the value $E_V$ is a function of the value $B_V$.

Some programmed shutters serving as a shutter and a lens stop have a range ($\gamma<1$) where the operation is effectuated with a constant relation between time and aperture opening diameter (F value) when the brightness is relatively high, and a range ($\gamma=1$) where the quantity of exposure is controlled only by the time with the aperture opening diameter maintained unchanged when the brightness is higher than a certain value. For such a programmed shutter, it is necessary to switch the aforementioned gamma ($\gamma$) according to the brightness ranges.

In a conventional programmed shutter having the ranges $\gamma<1$ and $\gamma=1$, a brightness detecting element made of cadmium sulfide (hereinafter referred to merely as "a CdS" when applicable) is employed, and switching the gamma is accomplished by utilizing the fact that the resistance of the CdS provides ($\gamma<1$) in the case of the high brightness range and ($\gamma \div 1$) in the case of the low brightness range. Furthermore, the approximation of the gamma ($\gamma$) is used as indicated in FIG. 2, in which reference numeral (1) designates a curve in which switching the gamma ($\gamma$) is ideally performed, and reference numeral (2) designates a curve indicating the variations of resistance of the CdS.

However, the variation characteristic of resistance of the CdS with respect to a wide range of brightness is relatively inaccurate. Specifically, the variation characteristics of resistance of the CdS is not for example like the characteristics of a photo-diode, where the variations of optical current with respect to a wide range of brightness are of $\gamma=1$. That is, with the CdS, the brightness range which is considered similar to the characteristics in which switching the gamma is ideally performed is limited, and accordingly the brightness range employable for a camera is, in general, limited. Furthermore, in general, it is difficult to switch the gamma only by means of the light receiving element. The response of the CdS to variations of light is slow, especially in the range of low brightness, and it is slow when compared with that of a photodiode. However, the variations of the output optical current of the photo-diode with respect to the entire range of brightness is $\gamma=1$. Therefore, the photo-diode cannot be used for the programmed shutter without modification, which is controlled with the exposure control time for brightness being of $\gamma<1$.

Thus, an element such as a photo-diode whose output varies with $\gamma=1$ in the entire range of brightness cannot be employed for a programmed shutter, especially a programmed shutter having ranges different in gamma ($\gamma$), although the element is superior to the CdS.

SUMMARY OF THE INVENTION

In this invention, a brightness detecting element, such as a photo-diode, whose output variations is of $\gamma=1$ in all the range of brightness is used for a programmed shutter. Yet the variations of exposure control time with respect to brightness are switched to those in the ranges $\gamma=1$ and $\gamma<1$ by circuitry instead of mechanical switch means.

Accordingly, it is an object of this invention to provide for an improved gamma switching circuit for a camera having a programmed shutter.

It is another object of this invention to provide for an improved photooptical sensor using a gamma switching circuit to accomplish improved performance in a camera having a programmed shutter.

Still another object of this invention is to provide an improved gamma switching circuit that is economical to manufacture yet reliable.

These and other objects of this invention are accomplished by a gamma switching circuit of a programmed shutter having a voltage conversion circuit which subjects to logarithmic compression an optical current which varies with $\gamma=1$ with respect to brightness variation. A constant voltage circuit in which only inflow current is available is employed with a time setting circuit including a switching circuit and a shutter controlling magnet driving circuit. The output terminal of the voltage conversion circuit is connected through a series circuit of two resistors to the output terminal of the constant voltage circuit, and the connection point between the two resistors is connected to the input terminal of the time setting circuit. The constant voltage circuit applies a voltage to one input terminal of a differential amplifier circuit, and the collector of a transistor whose base is connected to the output terminal of the differential amplifier circuit is connected to the other input terminal of the differential amplifier. The other input terminal of the differential amplifier is employed as an output terminal.

BRIEF DESCRIPTION OF THE DRAWINGS

FIG. 1 is a graphical representation for a description of the gamma of shutter control time;

FIG. 2 is a graphical representation indicating variations of resistance with brightness in a brightness detecting element (CdS);

FIG. 3 is a diagram for a description of the principle of operation and function of a gamma switching circuit according to this invention;

FIG. 4 is a circuit diagram showing an example of the constant voltage source circuit in which current flows only into the circuit;

FIG. 8 is a graphical representation indicating a typical example of the $E_V$ vs $T_V$ operating characteristics of the circuit according to the invention;

FIG. 9 is a graphical representation indicating characteristic curves obtained when the ratio of the resistances of resistors $R_1$ and $R_2$ is changed in the circuit according to the invention; and FIG. 10 is a graphical representation indicating a typical example of characteristic curves obtained when the voltage of a constant voltage source E1 is changed.

DESCRIPTION OF THE PREFERRED EMBODIMENT

Figure 5:
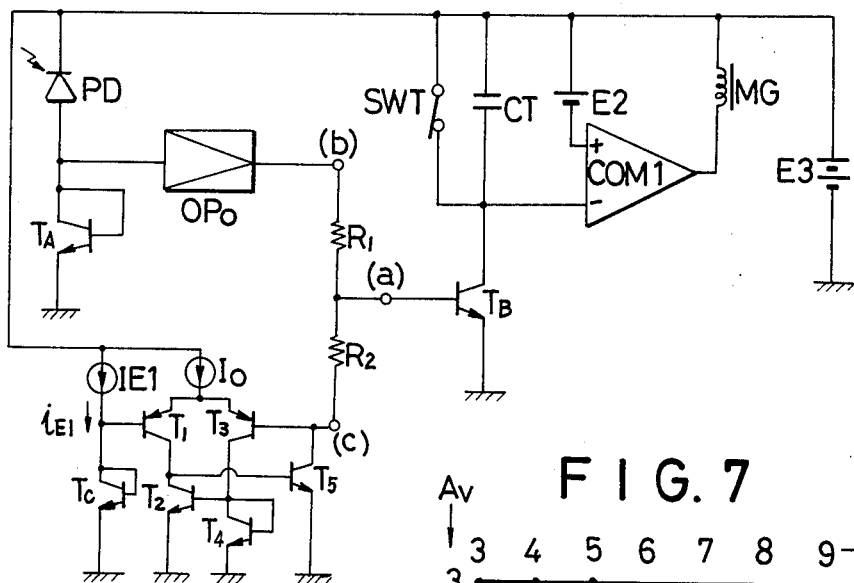
FIG. 5 is a circuit diagram showing one example of the gamma switching circuit according to the invention.

Referring now to FIG. 3 a diagram of a description of the principle of the operation and function of the gamma switching circuit according to the invention is shown. In circuit $OP_1$, an optical current $i_p$ produced by a photo-diode PD with $\gamma - 1$ with respect to a brightness is allowed to flow to the collector of a diode-connected transistor $T_A$ to provide a logarithmic compression voltage. This voltage is applied to an amplifier $OP_O$ to obtain a voltage at the output terminal b. In this connection, it is assumed that the amplification degree of the amplifier $OP_O$ is one (1) for simplification in this description. If a voltage developed across the base and the emitter of the transistor $T_A$ is designated $V_{BET-A}$, then the following relation (1) between the voltage $V_{BET-A}$ and the optical current $i_p$ flowing in the transistor $T_A$ is established:

$$V_{BET-A} = (KT/q) \ln (i_p/i_o) + V_{BEO} \quad (1)$$

where K is the Boltzmann's constant;
q is the electron charge;
T is the absolute temperature;
$i_o$ is the collector current having a value; and
$V_{BEO}$ is the voltage developed across the base and the emitter of the transistor $T_A$ when the collector current $i_o$ flows.

In FIG. 3, reference character $OP_2$ designates a constant voltage generating circuit in which the direction of current as viewed from its output terminal is such that it flows only into the circuit. $D_1$ designates an ideal diode to define the direction of the current. It is assumed that when a current having a value $i_{E1}$ is presented to the collector of a diode-connected transistor $T_C$ from a constant current source $I_{E1}$ a voltage $V_{BET-C}$ is developed across the base and the emitter of the transistor $T_C$. It is further assumed that the amplification degree of an amplifier $OP_{OO}$ is one (1) and the voltage at its output terminal c is $V_{E1}$ ($V_{F1} = V_{BET-C}$). Output terminal b of the amplifier $OP_1$ is connected through a series circuit of resistors $R_1$ and $R_2$ to the output terminal c of the constant voltage generating circuit $OP_2$. The resistors $R_1$ and $R_2$ are connected to a connection point a.

The circuits $OP_1$ and $OP_2$ and the resistors $R_1$ and $R_2$ from a circuit $OP_3$ which employs the connection point a as its output terminal. In FIG. 3, $OP_4$ designates a circuit including the time setting section and the magnet (MG) control section of a conventional ES circuit.

The voltage at the output terminal a is applied to the base of a transistor $T_B$ in the circuit $OP_4$. The collector of the transistor $T_B$ is connected through a parallel circuit of a switch $SW_T$ and a capacitor $C_T$ to an electric source $E_3$ and to the inversion terminal ($-$) of a voltage comparator COM-1. The non-inversion terminal of comparator COM-1 is connected through an electric source $E_2$ to the electric source $E_z$. The output terminal of the voltage comparator COM-1 is connected through the magnet MG to the electric source $E_3$.

If it is assumed that the voltage applied across the base and the emitter of the transistor $T_B$ is $V_{BET-B}$, then as in the equation (1), the following equation (2) can be obtained:

$$V_{BET-B} = (KT/q) \ln (I_C/i_o) + V_{BEO} \quad (2)$$

where, $I_C$ is the collector current of the transistor.

Normally, the switch $SW_T$ is closed, and the potential of the non-inversion terminal of the voltage comparator COM-1 is higher than that of the inversion terminal. Therefore the magnet MG is energized. When the switch $SW_T$ is opened in synchronization with the start of opening the shutter, the constant current integration of the capacitor $C_T$ with the collector current $I_C$ of the transistor $T_B$ starts. The charge voltage of the capacitor is compared with the voltage of the reference electric source $E_2$ in the voltage comparator COM-1. When the charge voltage becomes higher than the voltage of the reference electric source $E_2$, the output voltage of the voltage comparator COM-1 is inverted. As a result the magnet MG is deenergized. When the magnet MG is energized, the shutter closing operation is maintained, but when the magnet MG is deenergized, the shutter closing operation is released. Hence the shutter starts closing itself.

Figure 6:
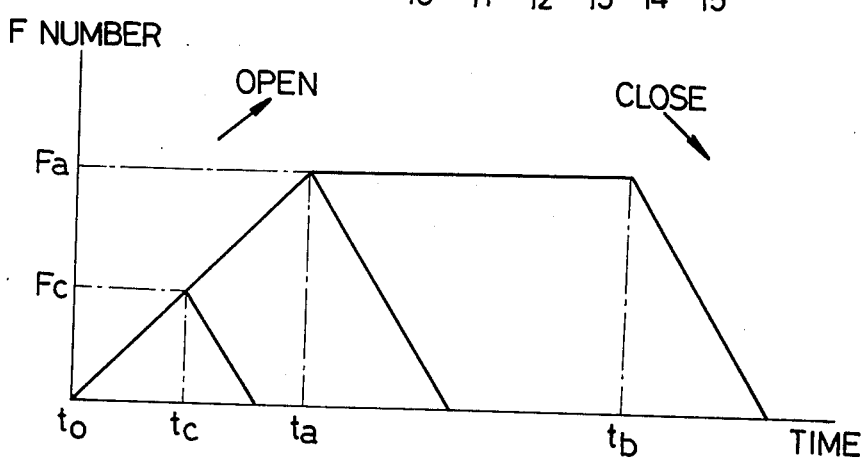
FIG. 6 is a graphical representation indicating a typical example of shutter blades opening and closing operation characteristics.

FIG. 6 is a graphical representation indicating a typical example of the opening and closing operation characteristics of the shutter blades which serve both as the shutter and the aperture. During the period of time from the time instant $t_o$ when the switch $SW_T$ is opened to the time instant $t_a$, the full-aperture value $F_a$ is obtained. The value $F_a$ and the time, function in a predetermined relation to determine a quantity of exposure. This will be referred to as "a region of $\gamma < 1$". For instance, at the time instant $t_c$ the shutter blades start closing ($t_c < t_a$). After the value F reaches the value $F_a$, the value F is maintained unchanged and the quantity of exposure is controlled as the function of time. This will be referred to as "a region of $\gamma = 1$". For instance, at the time instant $t_b$ the shutter starts closing ($t_b > t_a$).

The operation will now be described in more detail.

The constant current integration of the capacitor $C_T$ with the collector current $I_C$ of the transistor $T_B$ starts simultaneously with the opening of the switch $SW_T$ (which operates in synchronization with the start of opening the shutter blades). The relation between the exposure control time T and the collector current $I_C$ can be expressed by the following equation (3):

$$C \times V_2 = I_C \times T \quad (3)$$

If arranged, $$T = (C \times V_2)/I_C \tag{3'}$$

where, C is the capacitance of the capacitor $C_T$; and $V_2$ is the voltage of the reference voltage source E2.

The base-emitter voltages $V_{BET-A}$, $V_{BET-B}$ and $V_{BET-C}$ of the transistors $T_A$, $T_B$ and $T_C$ can be represented by the following equations (4), (5) and (6), respectively:

$$V_{BET-A} = \frac{KT}{q} \ln \frac{i_p}{i_o} + V_{BEO} \tag{4}$$

$$V_{BET-B} = \frac{KT}{q} \ln \frac{I_C}{i_o} + V_{BEO} \tag{5}$$

$$V_{BET-C} = \frac{KT}{q} \ln \frac{i_{E1}}{i_o} + V_{BEO} \tag{6}$$

where, $i_p$ is the optical current of the photo-diode PD; $I_C$ is the collector current of the transistor $T_C$; and $i_{E1}$ is the value of current flowing in the constant current source $I_{E1}$. It is assumed that the transistors $T_A$, $T_B$ and $T_C$ are equal in characteristic.

Equation (4) indicates also the voltage at the circuit point b in FIG. 3, and equation (6) indicates also the voltage at the circuit point c in FIG. 3.

If $V_{BET-A} > V_{BET-C}$, then the current flows in the resistors $R_1$ and $R_2$ in the direction $i_X$ in FIG. 3. The voltage at circuit point a can be expressed by the following equation (7):

$$V_a = (V_{BET-A} - V_{BET-C}) \times \frac{r_2}{r_1 + r_2} + V_{BET-C} \tag{7}$$

where,
$r_1$ is the resistance of the resistor $R_1$;
$r_2$ is the resistance of the resistor $R_2$; and
$V_a$ is the voltage at the circuit point a.

Since circuit point a is connected to the base of the transistor $T_B$, $$V_a = V_{BET-B} \tag{8}$$

If the equation (8) is rearranged by substituting the equations (4) through (7) thereinto, then:

$$\frac{KT}{q} \ln \left\{ \left( \frac{i_p}{i_{E1}} \right)^{\frac{r_2}{r_1+r_2}} \times \left( \frac{i_{E1}}{i_o} \right) \right\} = \frac{KT}{q} \ln \frac{I_C}{i_o} \tag{9}$$

With respect to the logarithmic terms, $$\left( \frac{i_p}{i_{E1}} \right)^{\frac{r_2}{r_1+r_2}} \times \frac{i_{E1}}{i_o} = \frac{I_C}{i_o} \tag{10}$$

Therefore, $$\left( \frac{i_p}{i_{E1}} \right)^{\frac{r_2}{r_1+r_2}} \times i_{E1} = I_C \tag{11}$$

From the equation (3'), $$T = CV_2/I_C \tag{12}$$

$$= (CV_2/i_{E1}) \cdot (i_{E1})^{\frac{r_2}{r_1+r_2}} /(i_p)^{\frac{r_2}{r_1+r_2}}$$

If the values $r_1$, $r_2$, $i_{E1}$, C and $V_2$ are constants, then $$T = K/(i_p)^Z \tag{13}$$

where $K = CV_2(i_{E1})^Z/i_{E1} \tag{14}$ and $$Z = \frac{r_2}{r_1 + r_2} \tag{15}$$

Therefore, the exposure control time T is a function of $(i_p)^Z$. Since the value Z corresponds to the gamma ($\gamma$) of the time, the gamma can be determined as desired by selecting the values $r_1$ and $r_2$ ($\gamma < 1$).

The case where $V_{BET-A} < V_{BET-C}$ will now be described.

If the voltage at circuit point c is higher than the voltage at circuit point b in FIG. 3, the current should flow in resistors $R_1$ and $R_2$ in the direction $i_Y$ as indicated in FIG. 3. However, the current does not flow in that direction ($i_Y$) due to the following reason. In the circuit OP2 in which the base-emitter voltage of the transistor $T_C$ is produced, the direction of current is determined by the ideal diode D1 connected to the output terminal. However, since there is no other circuit to supply current to circuit point c, the current does not flow in the direction of $i_Y$, and therefore no voltage drop occurs through the resistors $R_1$ and $R_2$. Thus, the voltage at circuit point b is solely applied to circuit point a. This can be expressed as follows:

$$V_{BET-A} = V_{BET-B} \tag{16}$$

Therefore, $$\frac{KT}{q} \ln \frac{i_p}{i_o} + V_{BEO} = \frac{KT}{q} \ln \frac{I_C}{i_o} + V_{BEO} \tag{17}$$

Accordingly, $$i_p = I_C \tag{18}$$

From the equation (3'), $$T = K'/i_p \tag{19}$$

where, K' is the constant.

Since the exponent of the value $i_p$ is one (1), the variation of time with respect to the variation of brightness is effected with $\gamma = 1$.

The arrangement of the circuit OP2 in which the direction of current as viewed from the output terminal c is such that the current flows only into the circuit. This will be described with reference to FIG. 4. In the circuit shown in FIG. 4, the base-emitter voltage of a transistor $T_C$ diode-connected is driven with constant current by a constant current source $I_{E1}$. The base-emitter voltage is applied to one of the input terminals of a differential amplifier circuit formed with transistors $T_1$ and $T_2$. The collector of a transistor $T_5$ is connected to an output terminal c and to the other input terminal of the differential amplifier circuit. Hence, the other input terminal is employed as the output terminal c.

Reference characters $T_1$ and $T_3$ designate PNP type transistors, and reference characters $T_2$, $T_4$ and $T_5$ designate NPN type transistors. The emitter of the transistor $T_1$ is connected to the emitter of the transistor $T_3$. The current ($I_o$) of a constant current source is applied to the emitter of the transistors $T_1$ and $T_3$. The base of the transistor $T_1$ is connected to the transistor $T_C$ which is driven with the constant current $i_{E1}$. The collector of the transistor $T_1$ is connected to the collector of the transistor $T_2$ and to the base of the transistor $T_5$. The base of the transistor $T_2$ is connected to the collector (base) of the diode-connected transistor $T_4$ and to the collector of the transistor $T_3$. The collector of the transistor $T_5$ is connected to the base of the transistor $T_3$.

The circuit of FIG. 4 can easily be modified to form a conventional operational amplifier. In such a modification, the collector of the transistor $T_5$ is connected through an element such as a resistor to the electric source $E_3$.

Because of the characteristics of such an operational amplifier, the base-emitter voltage of the diode-connected transistor $T_C$ which is driven with the constant current $i_{E1}$ is applied to circuit point c. Similarly, in the circuit shown in FIG. 4, when the current $i_x$ flows to the collector of the transistor $T_5$, it functions as an operational amplifier, and the base-emitter voltage of the diode-connected transistor $T_C$ is applied to the circuit point c. However, since the collector of the transistor $T_5$ is connected only to the base of the transistor $T_3$, no current $i_y$ flows outside from the circuit point c. (the small base current of the transistor $T_3$ can be disregarded). Thus, it is possible to provide a constant voltage generating circuit which gives directivity to the flow of current from the circuit point c. If the transistors $T_1$ and $T_3$ are Darlington-connected, the bias currents to the input and output terminals can be reduced, and therefore the effects to the surrounding circuits can be minimized.

The circuit according to this invention can be obtained by consolidating the above-described circuit. One example of the circuit according to the invention is as shown in FIG. 5. The operation of the circuit is identical to the that described for FIG. 3. It is shown to illustrate how the constant voltage generating circuit is coupled in a complete circuit according to this invention.

Figure 7:
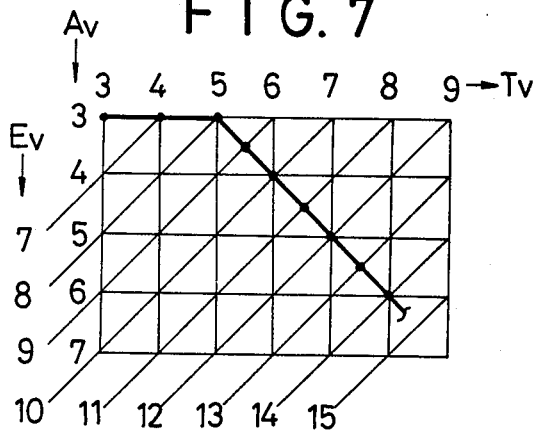
FIG. 7 shows a typical example of programmed shutter operating characteristics indicated on an APEX diagram.

The results of the actual operation of the circuit shown in FIG. 5 will now be described. FIG. 7 is a graphical representation indicating a typical example of the characteristic of a programmed shutter, and more specifically shows the combinations of the values $A_V$ and $T_V$ according to the values $E_V$. In the range darker than $E_V 8$, $A_V = 3$ and only the value $T_V$ changes. In the range lighter than $E_V 8$, the variations of $T_V$ with respect to the variations of $E_V$ are indicated with $\gamma = 0.5$.

The results of operation with the characteristics shown in FIG. 7 are indicated in FIG. 8. As is apparent from FIG. 8, when change is made from $E_V 8$ to $E_V 7$, $T_V 5$ is changed to $T_V 4$, and therefore $\gamma = 1$ in the range darker than $E_V 8$. When $E_V 8$ is changed to $E_V 10$ (the amount of change being 2 $E_V$), $T_V 5$ is changed to $T_V 6$. Therefore the time set by the time setting circuit is changed as much as that corresponding to 1 $E_V$. This change is in the range with $\gamma = 0.5$. In this case, the resistances $r_1$ and $r_2$ of the resistors $R_1$ and $R_2$ in FIG. 5 are equal to each other; $r_1 = r_2$ in the equation (15).

FIG. 9 indicates typical examples of the case where the value $\gamma$ is changed. Reference numeral (1) in FIG. 9 indicates the characteristics of a range with $\gamma = 1$. If the switching point of the gamma ($\gamma$) is unchanged, the characteristics of the range with $\gamma = 1$ are determined according to the values $\gamma$. For instance, by selecting the values $r_1$ and $r_2$ of the equation (15) the characteristics (3) in FIG. 9 ($\gamma < 0.5$) and the characteristics (4) in FIG. 9 ($0.5 < \gamma < 1$) can be obtained.

FIG. 10 indicates a typical example of the case where the value $\gamma$ is maintained constant, and the gamma ($\gamma$) switching $E_V$ value (hereinafter referred to as "a gamma ($\gamma$) switching point" when applicable) is changed. If the voltage value at circuit point c in FIG. 5, i.e., the base-emitter voltage of the transistor $T_C$ is changed (by changing the current value $i_{E1}$ of the constant current source $I_{E1}$), the gamma switching point can be set by correlating the variation of the voltage at circuit point c and the brightness with the output voltage (at the circuit point b) of the voltage conversion circuit (which subjects the optical current of the photo-diode PD, which changes with $\gamma = 1$, to logarithmic compression). That is, the point where the voltage at circuit point c coincides with the voltage at circuit point b correspond to the gamma ($\gamma$) switching point.

Therefore, if the voltage at the circuit point c is increased, the gamma ($\gamma$) switching point is shifted towards the high value of $E_V$. On the other hand if the voltage at the circuit point c is decreased, the gamma ($\gamma$) switching point is shifted towards the low value of $E_V$. Since the gamma ($\gamma$) is maintained unchanged in the ranges with $\gamma = 1$ and $\gamma = 1$, the inclinations of the graphs in the ranges with $\gamma = 1$, and $\gamma = 1$ are not changed.

As is apparent from the above description, according to the invention, it is possible to use a photo-diode having quick response characteristics to optical change. Therefore the optical response speed, which is a difficulty common in a conventional brightness detecting element (CdS) can be improved.

A brightness detecting element in which the output variation with respect to brightness variation is of $\gamma = 1$ can be employed according to the invention. Therefore, unlike conventional techniques, it is unnecessary to intricately change the characteristics of the light receiving element. Thus, a light receiving element having relatively simple characteristics which can be readily operated, can be employed.

As indicated in FIG. 9, the value of gamma ($\gamma$) can be set as desired by changing the ratio of the resistances of the resistors $R_1$ and $R_2$ and therefore the gamma characteristics of the mechanism of the shutter blades can be readily changed. Furthermore, as shown in FIG. 10, the gamma switching point can be readily changed by changing the output voltage of the constant voltage generating circuit in which the current flows only into the circuit as viewed from the output terminal. Thus, setting the gamma (when $\gamma = 1$) and the gamma switching point can be readily achieved.

It is apparent that modifications to this invention may be made without departing from the essential scope of the invention.

I claim:

1. A gamma switching circuit of a programmed shutter comprising: means for generating an optical current varying with respect to brightness of light; a voltage conversion circuit for logarithmic compression of said optical current; a constant voltage circuit in which only inflow current is available and no outflow current is available at the output terminal thereof; and a time setting circuit including a switching circuit and a shutter controlling magnet driving circuit, the output terminal of said voltage conversion circuit being connected at a connection point to the output terminal of said constant voltage circuit, and the connection point being connected to the input terminal of said time setting circuit.

2. A gamma switching circuit of claim 1 wherein said constant voltage circuit includes a differential amplifier circuit and transistor, said constant voltage circuit including means applying a voltage to one input terminal of said differential amplifier circuit, and said transistor having its base connected to the output terminal of said differential amplifier circuit and the collector being connected to the other input terminal of said differential amplifier, said other input terminal of said differential amplifier being employed as an output terminal.

3. The gamma switching circuit of claims 1 or 2 wherein said means for generating an optical current is a photo-diode.

4. The gamma switching circuit of claim 3 wherein said optical current varies with $\gamma=1$ with respect to variations in the brightness of light.

5. The gamma switching circuit of claim 1 further comprising a series circuit of two resistors disposed between the output terminal of the voltage conversion circuit and the output terminal of said constant voltage circuit, said connection point being placed between said resistors.

6. The gamma switching circuit of claim 5 wherein said constant voltage circuit includes a differential amplifier circuit and a transistor, said constant voltage circuit further including means applying a voltage to one input terminal of said differential amplifier, said transistor having its base connected to the output terminal of said differential amplifier circuit and its collector being connected to the other input terminal of said differential amplifier, said other input terminal being employed as an output terminal.

7. The gamma switching circuit of claims 1 or 6 wherein said time setting circuit comprises an input transistor having its base coupled to said connection point, and a parallel circuit of an integrating capacitor and a switch coupled to the collector of said input transistor.

8. The gamma switching circuit of claim 7 wherein said shutter controlling magnet driving circuit comprises a comparator having its output coupled to the shutter control magnet, said comparator having its inversion input terminal coupled to parallel circuit and, a voltage source coupled to the other input terminal of said comparator.

9. The gamma switching circuit of claims 1 or 6 wherein said voltage conversion circuit comprises a diode connected transistor having its collector and base coupled to said means for generating an optical current and an amplifier for amplifying the resulting logarithmic compression voltage.

10. The gamma switching circuit of claim 9 wherein said means for generating an optical current comprises a photo-diode having an output current varying with $\gamma=1$ with respect to variations in the brightness of light.

* * * * *